United States Patent
Dinnocenzo et al.

(10) Patent No.: US 6,569,600 B2
(45) Date of Patent: May 27, 2003

(54) OPTICAL RECORDING MATERIAL

(75) Inventors: Joseph P. Dinnocenzo, Penfield, NY (US); Samir Y. Farid, Rochester, NY (US); Douglas R. Robello, Webster, NY (US); Turan Erdogan, Spencerport, NY (US)

(73) Assignee: Eastman Kodak Company, Rochester, NY (US)

( * ) Notice: Subject to any disclaimer, the term of this patent is extended or adjusted under 35 U.S.C. 154(b) by 89 days.

(21) Appl. No.: 09/822,057

(22) Filed: Mar. 30, 2001

(65) Prior Publication Data

US 2003/0072250 A1 Apr. 17, 2003

(51) Int. Cl.[7] .................................................. G11B 7/24
(52) U.S. Cl. .......................... 430/270.15; 430/1; 430/2; 430/945; 369/288; 359/3
(58) Field of Search ................................ 430/1, 2, 945, 430/270.15; 359/288; 369/3; 522/63

(56) References Cited

U.S. PATENT DOCUMENTS

| | | | | |
|---|---|---|---|---|
| 3,658,526 A | * | 4/1972 | Haugh | 430/1 |
| 4,298,678 A | * | 11/1981 | McKeever | 430/281.1 |
| 4,491,432 A | * | 1/1985 | Aviram et al. | 400/241.1 |
| 4,707,430 A | * | 11/1987 | Ozawa et al. | 430/945 |
| 4,780,393 A | * | 10/1988 | Frommeld | 430/277.1 |
| 5,185,233 A | * | 2/1993 | Santo | 430/945 |
| 5,759,721 A | | 6/1998 | Dhal et al. | 430/1 |
| 6,221,536 B1 | * | 4/2001 | Dhar et al. | 430/1 |

FOREIGN PATENT DOCUMENTS

JP   2000-086588   3/2000

OTHER PUBLICATIONS

Machine translation of JP 2000–086588.*
Renge et al., "Inhomogeneous Broadening and pressure shifts of the optical spectra in organic glasses at low temperatures", J. Luminesc., vol. 86 (2000) pp. 241–247.*
Gassman, Paul G., "Strained Hydrocabons" in "Photoinduced Electron Transfer, Part C. Photoinduced Electron Transfer Reactions:Organic Substrates", Chapter 4.2 pp. 70–87 (1988).*

* cited by examiner

Primary Examiner—Martin Angebranndt
(74) Attorney, Agent, or Firm—Harold E. Cole; Paul A. Leipold

(57) ABSTRACT

An optical recording material which when exposed to actinic radiation produces a change in optical properties in the exposed regions, thereby providing a pattern of intelligence for storing and retrieving information, the recording material comprising:

a) a binder;
b) a reactant which is capable of undergoing a chemical transformation upon a one electron oxidation, thus causing the change in optical properties in the exposed regions; and
c) a sensitizer capable of absorbing actinic radiation to cause an initial one electron oxidation of the reactant.

19 Claims, No Drawings

OPTICAL RECORDING MATERIAL

FIELD OF THE INVENTION

This invention relates to an optical recording element which is capable of storing and retrieving information.

BACKGROUND OF THE INVENTION

The modem information revolution has led to an ever increasing demand for data storage systems. As a case in point, CD and DVD disks represent successful high volume data storage technologies. One major advantage of these technologies is that reading or writing of data is accomplished by shining light on the disk so there is no physical contact between the media and the optical head. However, the total storage capacity of these disks is limited by the size of the smallest marks on the surface of the media that can be read by the wavelength of light employed. Many attempts have been made to develop data storage systems with progressively smaller marks. However, the required equipment is prohibitively expensive, and the data access rates tend to be unacceptably slow.

One way to increase the storage capacity of a medium is to record the information depthwise, rather than just on the surface. There could be used holography, two-photon optics, and similar methods for illuminating media in three dimensions, with the goal of producing marks in three dimensions, and thereby providing very high data capacity systems.

Bleaching and photoreactions (e.g., photochromicity) of organic dyes has also been used as a means to record optical data, both in a single layer in writeable CD-type media, and depthwise (dissolved in a bulk piece of polymer). However, a large amount of optical power is required in these systems to produce readable marks, therefore the rate of recording of such media is slow. Also, many photochromic systems also tend to fade over time.

Holographic recording has also been achieved by optically induced birefringence in suitable polymers, a process which relies on photo-alignment of the side chains within the polymers. Once again, a large amount of optical power is required, and this process is inefficient and slow. In addition, the fidelity of the recorded information may degrade with time since optically induced orientation tends to relax over time in polymers.

JP 2000-086588 discloses a recording medium using changes in circular dichroism based on the interconversion of chiral norbornadiene and quadricyclane derivatives. However, this technique requires enantiomerically enriched compounds that are difficult to synthesize. Furthermore, this application does not disclose the use of sensitizers for photoinduced electron transfer.

U.S. Pat. No. 5,759,721 discloses a holographic recording medium which uses a photopolymerization technique which can also be used for recording information optically in three dimensions.

There is a problem with this process, however, in that photopolymerization is usually accompanied by shrinkage of the material which is a consequence of the process of forming new chemical bonds among the constituents. Any dimensional changes that occur on writing limit the resolution that can be achieved, and reduce the data capacity of the medium. In addition, photopolymerization generally requires the use of low molecular weight reactants so that media made from these materials tend to be undesirably soft or sticky. Furthermore, the most common method of photopolymerization, free radical polymerization, is subject to interference by atmospheric oxygen which causes undesirable inconsistencies in the process.

It is an object of this invention to increase the storage capacity of a optical recording material. It is another object of this invention to provide an optical recording material which can record information depthwise, rather than just on the surface. It is still another object of this invention to provide an optical recording material which does not substantially change dimensions upon recording.

SUMMARY OF THE INVENTION

These and other objects are achieved in accordance with the invention which comprises an optical recording material which when exposed to actinic radiation produces a change in optical properties in the exposed regions, thereby providing a pattern of intelligence for storing and retrieving information, the recording material comprising:
  a) a binder,
  b) a reactant which is capable of undergoing a chemical transformation upon a one electron oxidation, thus causing the change in optical properties in the exposed regions, and
  c) a sensitizer capable of absorbing actinic radiation to cause an initial one electron oxidation of the reactant.

In accordance with the invention, an optical recording material is obtained which possesses several advantages over the prior art.

1. The invention involves a photoinitiated chain reaction in a solid polymer that creates changes in the optical properties of the material. However, because our invention relies on photoisomerization rather than photopolymerization, the dimensional changes accompanying recording are negligible. (No new bonds are formed between molecules.)

2. The invention involves a recording process that is efficient in the use of light. Because the process involves a photoinitiated chain reaction, many new molecules are formed per photon absorbed (chemical amplification). A relatively large change in optical properties is obtained with only a small exposure to the recording beam.

3. The material of the invention is a simple, stable polymer, which can be conveniently fabricated into films and slabs.

4. The optical changes in the material of the invention are large, permanent, localized, and can easily be detected, forming the basis for an optical storage medium. The invention is especially suited to three dimensional optical data recording systems such as holography and two-photon optics.

5. Unlike free radical polymerization, cation radical rearrangements of the invention are not sensitive to molecular oxygen, and will not be subject to the inconsistent performance which is commonly observed for free radical photopolymerizations that are currently used in the art.

DETAILED DESCRIPTION OF THE INVENTION

Any binder may be used in the invention provided it dissolves the reactant and sensitizer. Suitable binders include a monomeric glass as defined in U.S. Pat. Nos. 4,499,165 and 4,626,361, the disclosures of which are hereby incorporated by reference, such as sucrose octaacetate; or a polymeric material such as, for example, poly(alkyl methacrylate), poly(alkyl acrylate), polystyrene, polycarbonate, cellulose acetate or poly(vinyl butyral). In general, the binder should be optically transparent in the spectral region where the sensitizer absorbs, i.e., should not have significant absorption at the excitation wavelengths, and should not interfere with the chemical transformation of the reactant. The binder may also contain a plasticizer, a preservative, etc.

The optical recording element of the invention may be in the form of a self-supporting slab or disk. It may also be coated on a support such as poly(ethylene terephthalate), poly(ethylene naphthoate), polystyrene, cellulose acetate, inorganic supports such as glass, quartz, silicon, etc. In a preferred embodiment, the support is a polyester or glass.

The surface of the substrate may be treated in order to improve the adhesion of the recording layer to the support. For example, the surface may be corona discharge treated prior to applying the optical recording material. Alternatively, an under-coating or subbing layer, such as a layer formed from a halogenated phenol or a partially hydrolyzed vinyl chloride-vinyl acetate copolymer, can be applied to the surface of the support.

The recording layer thickness may range from about 1 μm to about 1 cm, preferably from about 100 μm to about 1000 μm.

As noted above, the reactant used in the invention is capable of undergoing a chemical transformation upon a one electron oxidation, thus causing the change in optical properties in the exposed regions of the optical recording material. Such compounds undergo a photoinduced cation radical rearrangement to product species, a process which defines the recording event. With the product formation, there are accompanying changes in optical characteristics such as refractive index, fluorescence properties, or absorption spectrum. No new chemical bonds are formed between individual reactant molecules, therefore, there are negligible dimensional changes in the media during the recording event.

The reactant is usually present in a relatively high concentration. In a preferred embodiment, the reactant comprises from about 1 to about 50% by weight of said material, the sensitizer comprises from about 0.001 to about 10% by weight of the material, with the balance being binder.

The chemical transformation of the reactant is an isomerization including reactions such as cyclizations, cycloadditions and cycloreversions. General examples of such transformations are the interconversion between 1a and 1b or 2a and 2b.

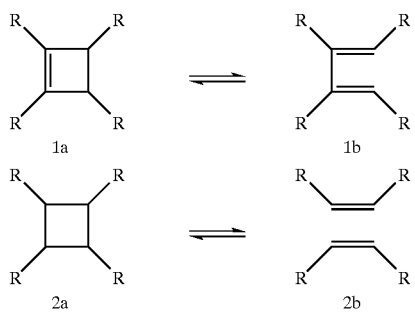

R in the formulas above and below can be H; a substituted or unsubstituted alkyl or alkoxy group having from about 1 to about 12 carbon atoms, preferably 1–3 carbon atoms, such as methyl, ethyl, isopropyl, butyl, etc; a cyano or a carboxylate group; a substituted or unsubstituted aryl group having from about 6 to about 18 carbon atoms, such as phenyl, naphthyl, phenanthryl, anthryl, etc.; a substituted or unsubstituted heteroaromatic group such as furyl, thienyl, pyridyl, benzofuryl, benzotbienyl, etc. Substituents on the aryl or heteroaryl groups include, for example, one or more alkyl, aryl, alkoxyl, aryloxyl, thioalkyl, thioaryl groups etc. In addition, some or all of the substituents R can be joined together to form additional ring systems.

Examples of 1a/1b are:

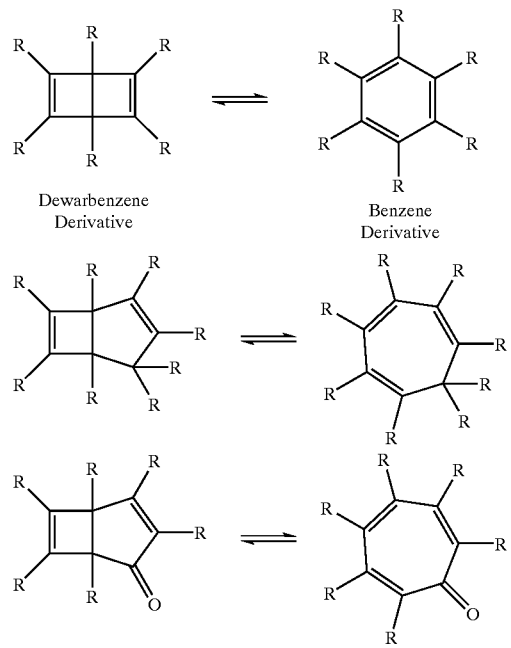

Examples of 2a/2b are:

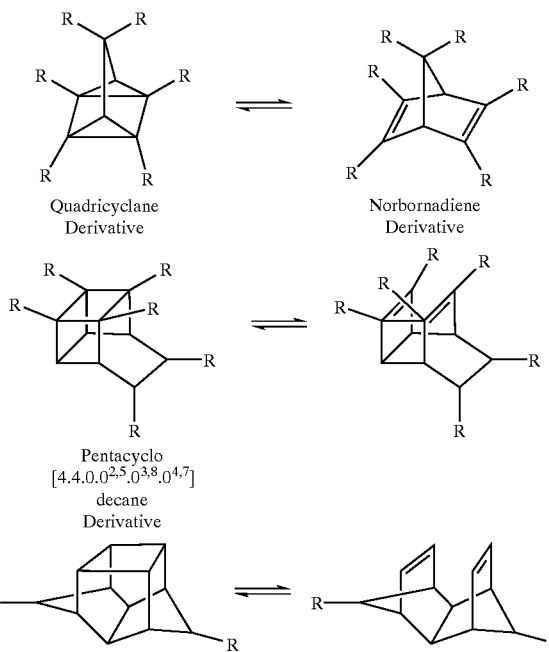

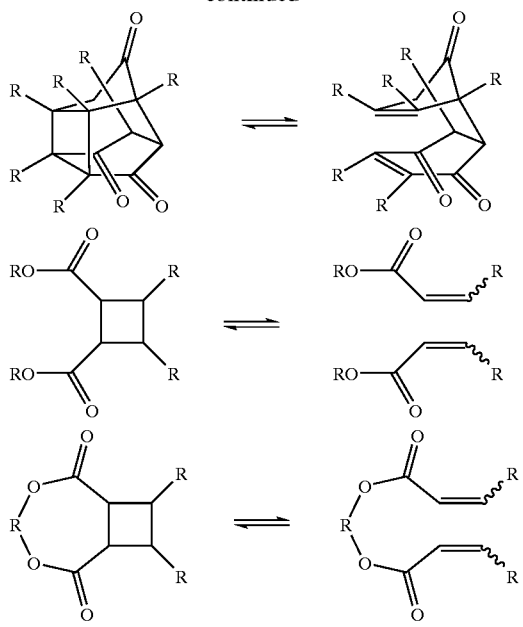
Specific examples of reactants 1a and 2a are shown in Table 1.

TABLE 1-continued

Reactants

R-12

[chemical structure: cyclobutane ring fused with two ester groups forming a macrocycle, with two p-methoxyphenyl (OCH₃) substituents]

R-13

[chemical structure: cubane-like cage with two CH₃ and two Ph substituents]

In a preferred embodiment, the reactant is selected so that its oxidation potential is less than that of its product, and that a suitably rapid isomerization can occur upon electron transfer to the sensitizer (see below). The compounds listed above possess these characteristics, but there may exist other (as yet unidentified) molecules that share the same properties, and that would function equally well or better than those listed.

The sensitizer used in the invention initiates the chemical transformation of the reactant. The sensitizer must be capable of oxidizing the reactant to a radical cation after the sensitizer has absorbed light (i.e., photoinduced electron transfer). There are two distinct classes of sensitizers which may be used in the invention.

In one embodiment, the sensitizer upon absorption of the actinic radiation is capable of accepting an electron from the reactant. Examples of such sensitizers include those shown in Tables 2 and 3.

In another embodiment of the invention, the sensitizer upon absorption of said actinic radiation fragments gives an oxidant capable of accepting an electron from the reactant. Examples of such sensitizers include those shown in Table 4.

To determine whether a sensitizer is capable of oxidizing the reactant to a radical cation after the sensitizer has absorbed light, reaction energetics may be used. There are three controlling parameters in reaction energetics: the excitation energy ($E_{S^*}$) and the reduction potential ($E_S^{red}$) of the sensitizing electron acceptor (S) and the oxidation potential ($E_R^{ox}$) of the reactant (R), an electron donor. For these reactions to be energetically feasible, the energy of the excited state should be higher or only slightly lower than the energy stored in the primary product, the radical ion pair, $S^{-\cdot}R^{+\cdot}$.

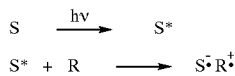

The excitation energy of the sensitizer (electron acceptor) is conveniently determined from the midpoint of the normalized absorption and emission spectrum of S, if the reaction proceeds from the singlet excited state. However, if the reaction proceeds via the triplet state, then the triplet energy of S should be used as the excitation energy.

The energy of the radical ion pair, $E_{IP}$, is given by Eq. 1, where Δ is an energy increment that depends on the medium polarity and ranges from nearly zero in highly polar media to ca. 0.3 eV in the least polar media. The electrochemical measurements in polar solvents such as acetonitrile or methylene chloride $$E_{IP} = E_R^{ox} - E_S^{red} + \Delta \qquad \text{Eq. 1}$$

Polymeric media tend to be low in dielectric constant, and as a result would not strongly solvate the radical ion pair. Thus, the energy increment Δ in Eq. 1 is expected to be near the maximum value, i.e., in the range of 0.2 to 0.3 eV.

Thus, sensitizing electron acceptors with excitation energy equal to or larger than the difference between the oxidation potential of the reactant and the reduction potential of the acceptor, ($E_R^{ox} - E_S^{red}$), will satisfy the energetic requirements of photoinitiating the reaction, Eq. 2.

$$E_{S^*} \geq E_R^{ox} - E_S^{red} \qquad \text{Eq. 2}$$

It is more convenient to express the energetic requirements of the sensitizing acceptor relative to the donor in terms of a rearranged form of Eq. 2.

$$E_{S^*} + E_S^{red} \geq E_S^{ox} \qquad \text{Eq. 3}$$

According to Eq. 3, for the reaction to be energetically feasible, the algebraic sum of the excitation energy of the sensitizer and its reduction potential should be approximately equal to or larger than the oxidation potential of the reactant.

For the specific example of the reactant hexamethyldewarbenzene, which has an oxidation potential of 1.59 V vs. SCE, numerous sensitizing acceptors, which meet the requirement of Eq. 3, can be used. Listed in Table 2 are some of the compounds that meet the requirements, namely having the sum of excitation energy plus reduction potential that is equal to or exceeds 1.59 eV, and are therefore useful with hexamethyldewarbenzene reactant.

TABLE 2

| Electron Transfer Sensitizers | | $E_{S^*}$ | $E_S^{red}$ |
|---|---|---|---|
| S-1 | [1-cyanonaphthalene structure] | 3.85 | −1.88 |
| S-2 | [9,10-dicyanoanthracene structure] | 2.90 | −0.91 |

TABLE 2-continued

| Electron Transfer Sensitizers | | $E_S$. | $E_S^{red}$ |
|---|---|---|---|
| S-3 | 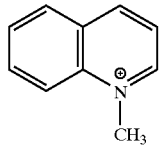 | 3.53 | −0.85 |
| S-4 | | 2.77 | −0.48 |
| S-5 | | 2.84 | −0.40 |

In general, derivatives from many different compounds can be used as electron accepting sensitizers for various reactants, provided that the energetic requirements discussed above are satisfied. These potential sensitizers include: cyanoaromatics such as 1-cyanonaphthalene, 1,4-dicyanonaphthalene, 9,10-dicyanoanthracene, 2,9,10-tricyanoanthracene, 2,6,9,10-tetracyanoanthracene, aromatic anhydrides and imides such as 1,8-naphthylene dicarboxylic, 1,4,6,8-naphthalene tetracarboxylic, 3,4-perylene dicarboxylic, and 3,4,9,10-perylene tetracarboxylic anhydride or imide; condensed pyridinium salts such as quinolinium, isoquinolinium, phenanthridinium, acridinium salts; and pyryllium salts. Among useful sensitizers that involve the triplet excited state are carbonyl compounds such as quinones such as benzo-, naphtho-, anthro-quinones with electron withdrawing substituents (e.g., chloro and cyano). Ketocoumarins especially those with strong electron withdrawing moieties such as pyridinium can also be used as sensitizers.

Examples of the above sensitizers are shown in Table 3. These sensitizers can optionally contain substituents such as methyl, ethyl, tertiary butyl, phenyl, methoxy, chloro, etc. that may be included to modify properties such as solubility, absorption spectrum, reduction potential, etc.

TABLE 3

| Electron Transfer Sensitizers | |
|---|---|
| S-6 | 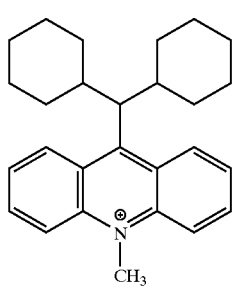 |
| S-7 | |
| S-8 | |
| S-9 | |
| S-10 | |
| S-11 | 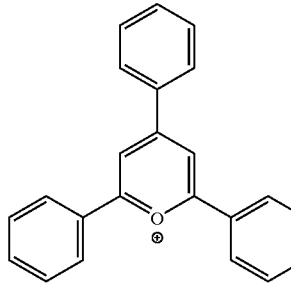 |

TABLE 3-continued
Electron Transfer Sensitizers
S-13 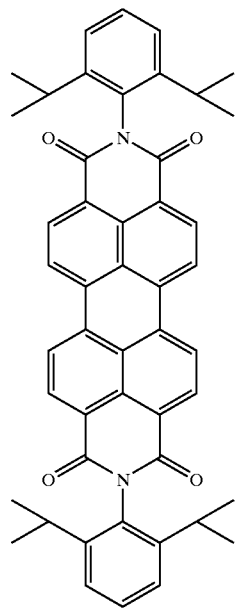
S-14 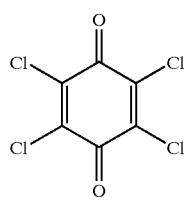
S-15 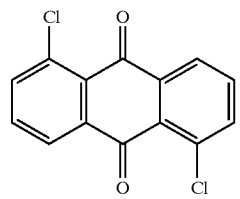
S-16 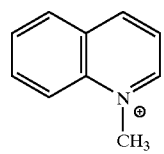
S-17 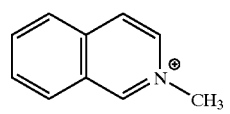
S-18 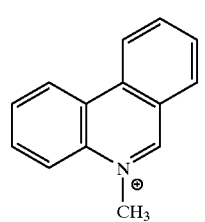
TABLE 3-continued
Electron Transfer Sensitizers
S-19 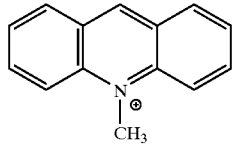
S-20 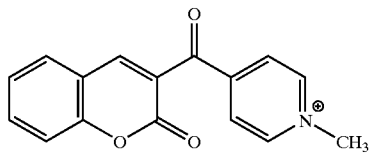
S-21 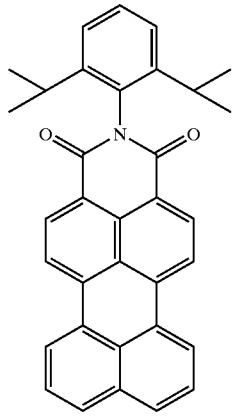
S-22 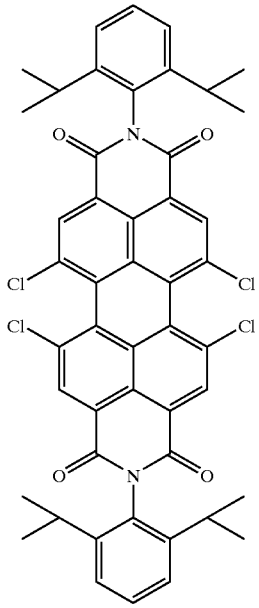
S-23 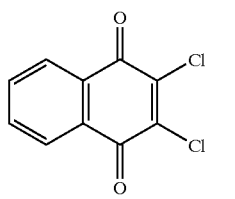

TABLE 3-continued

Electron Transfer Sensitizers

S-24

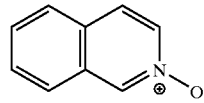

TABLE 4

Radical Cation-Generating Sensitizers

S-25

S-26

S-27

S-28

S-29

S-30

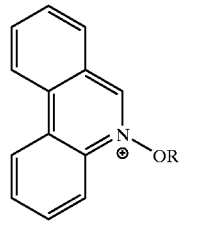

Where R = alkyl, substituted alkyl, aryl, or acyl.

2) Sensitization Via Photochemical Generation of a Radical Cation

In this approach, excitation leads to fragmentation of the sensitizer and the formation of an oxidizing radical cation. An example of this class of sensitizers is N-methoxyphenanthridinium, Eq. 4.

Eq. 4

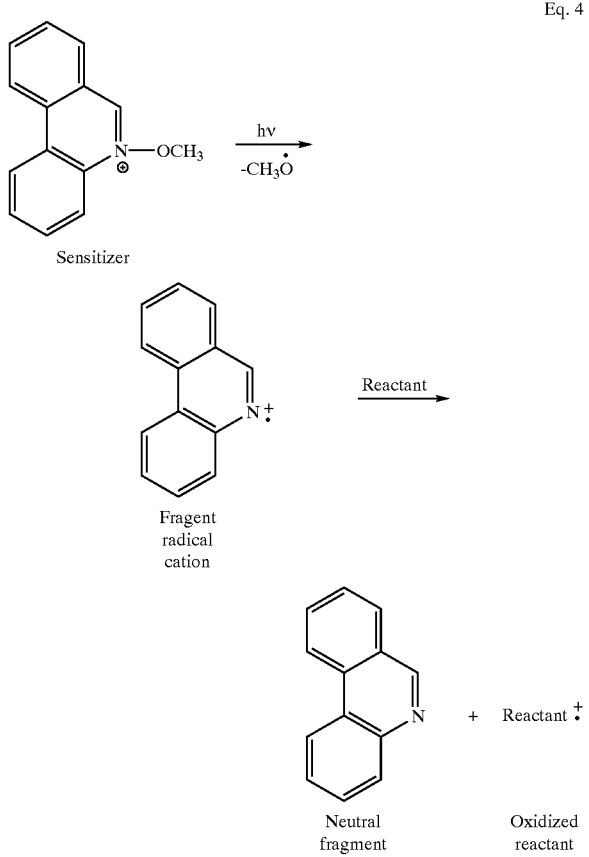

Sensitizer

Fragent radical cation

Neutral fragment

Oxidized reactant

In the above illustration, the sensitizer upon absorption of actinic radiation reacts to produce a fragment radical cation, the fragment radical cation then accepts an electron from the reactant, whereby the oxidation potential of the neutral fragment is greater than that of the reactant.

The following examples further illustrate the invention.

EXAMPLES

Synthesis of ethyl pentamethyldewarbenzoate (R-2)

A stirred mixture under nitrogen of 34.2 g of aluminum chloride and 140 mL of dry dichloromethane was cooled in an ice bath and then treated dropwise with 26.3 g (486 mmol) of 2-butyne dissolved in 70 mL of dry dichloromethane. Remnants of the butyne solution were rinsed into the reaction vessel with an additional 25 mL of dichloromethane, and the resulting mixture was stirred for 20 min. The reaction mixture was added under nitrogen via double tipped needle to a solution of 20.1 g (179 mmol) of ethyl 2-butynoate in 70 mL of dry dichloromethane in a second reaction vessel, also cooled in an ice bath.

The resultant deep red-brown clear solution was allowed to stir 15 min at 0° C., and then a solution of 70 mL of dimethyl sulfoxide (DMSO) and 170 mL of dichloromethane was added slowly. The reaction mixture was stirred for 45 min, and then was poured into 500 mL of ice water. The resulting mixture was twice extracted with pentane, and the combined organic extracts were washed three times with water and once with brine, then dried over sodium sulfate. The solvent was removed in vacuo to yield 45.9 g of a thin clear golden orange oil.

The product was isolated by distillation at reduced pressure, collecting the fraction boiling at 63–67° C./0.03–0.05 mm. The yield was 28.5 g (72% of theoretical) The product was characterized by NMR. $^1$H NMR (CDCl$_3$): δ1.20 (s, 3 H), 1.25 (s, 3 H), 1.30 (t, 3 H), 1.60 (s, 3 H), 1.65 (s, 3 H), 2.05 (s, 3 H), 4.20 (q, 4 H).

Synthesis of ethyl 2-phenyl-3,4,5,6-tetraamethyldewarbenzoate (R-3)

A magnetically stirred suspension of 6.16 g (46 mmol) of AlCl$_3$ and 30 mL freshly distilled CH$_2$Cl$_2$ was cooled in an ice water bath. 5.0 g (92 mmol) of 2-butyne in 15 mL CH$_2$Cl$_2$ was added over 20 minutes. The resulting solution was stirred for an addition 30 minutes after the addition was complete. This solution of the tetramethylcyclobutadiene aluminum chloride complex was transferred to another flask, which contained a stirred solution of 5.90 g (34 mmol) of ethyl phenylpropiolate in 30 mL CH$_2$Cl$_2$ in an ice water bath, via a double tipped needle under positive nitrogen pressure. Ten minutes following this addition, a solution of 15 mL DMSO and 15 mL CH$_2$Cl$_2$ was added over 15 minutes. The solution was allowed to stir for an additional 20 minutes after the DMSO addition was complete. The mixture was then poured into 100 mL of ice water, and the product was extracted into petroleum ether (2×200 mL). The combined organic layers were then washed with water (2×150 mL) and brine (1×100 mL) and dried over MgSO$_4$. Removal of solvent in vacuo yielded 11.0 g of a yellow oil.

The crude product was purified by preparative liquid chromatography (silica gel, hexanes/ethyl acetate) to provide 6.6 g of a light yellow oil. Recrystallization from hexanes at –78° C. gave the desired product as a white solid. The product was characterized by $^1$H NMR (CDCl$_3$): δ7.97–8.01 (m, 2 H), 7.42–7.38 (m, 3 H), 4.29–4.23 (m, 2 H), 1.76 (q, 3 H, J=1.2 Hz), 1.69 (q, 3 H, J=1.2 Hz), 1.38 (s, 3 H), 1.36 (t, 3 H, J=7 Hz), 1.35 (s, 3H).

Synthesis of ethyl 2-(4-cyanophenyl)-3,4,5,6-tetraamethyldewarbenzoate (R-4)

3.65 g of p-iodobenzonitrile, 6.25 g of ethyl propiolate, 220 mg of dichlorobis(triphenylphosphine)palladium, 120 mg CuI, and 4.42 g potassium carbonate were combined in a round-bottom flask along with 50 mL freshly distilled THF. This mixture was refluxed while magnetically stirring for 4 hrs. THF was then removed in vacuo. The reaction mixture was extracted with CH$_2$Cl$_2$ (2×150 mL). The combined organic layers were washed with H$_2$O (2×100 mL) and brine (1×100 mL), dried over MgSO$_4$, and concentrated to give a brown/black oily solid as a crude product. Purification by automated flash chromatography (silica gel, ethyl acetate/hexanes) gave the intermediate product ethyl (4-cyano) phenylpropiolate as a white solid in 45% yield. This intermediate product was analyzed by $^1$HNMR (CDCl$_3$) δ1.36 (t, 3 H, J=7.2 Hz), 4.31 (q, 2 H, J=7.2 Hz), 7.67 (s, 4 H).

The final product was prepared from this intermediate alkyne exactly as described for R-3. After purification by liquid chromatography (silica gel, ethyl acetate/hexanes), the resulting yellow solid was recrystallized from hexanes (2×) to give yellow crystals in 40% yield. The product was analyzed via $^1$HNMR (CDCl$_3$) δ1.37–1.32 (m, 9 H), 1.57 (q, 3 H, J=1.2 Hz), 1.72 (q, 3 H, J=1.2 Hz), 4.25 (qd, 2 H), 7.66 (d, 2 H), 8.01 (d, 2 H).

Synthesis of methyl 2-(4-methoxyphenyl)-3,4,5,6-tetraamethyldewarbenzoate (R-5)

The intermediate product in this synthesis, methyl (4-methoxy)phenylpropiolate, was synthesized according to the literature procedure (Morris, J; Wishka, D. G. *Synthesis* 1994, 43–46).

The final product was prepared from this intermediate alkyne exactly as described for R-3. After purification of the crude yellow solid via liquid chromatography (silica gel, ethyl acetate/hexanes), the resulting yellow solid was recrystallized from hexanes to give a white solid in 40% yield. The product was analyzed by $^1$HNMR (CDCl$_3$): δ1.30 (s, 3 H), 1.34 (s, 3 H), 1.65 (q, 3 H, J=1.3 Hz), 1.71 (q, 3 H, J=1.3 Hz), 3.77 (s, 3 H), 3.84 (s, 3 H), 6.91 (d, 2 H), 7.95 (d, 2 H).

Synthesis of dimethyl 3,4,5,6-tetraamethyl dewarbenzene-1,2-dicarboxylate (R-6)

This compound was synthesized according to the procedure for the synthesis of R-3. The product was isolated in 43% yield and was characterized by $^1$HNMR (CDCl$_3$): δ3.79 (s, 6 H), 1.63 (s, 6 H), 1.29 (s, 6 H).

Synthesis of 3,4,5,6-tetraamethyl dewarbenzene-1,2-bis(dipropylamide) (R-7)

A round-bottom flask was charged with 330 mg of KOH dissolved in 8 mL H$_2$O and 5 mL methanol. 50 mg of R-6 was added to this mixture and allowed to magnetically stir for 2.5 hours. This solution was then slowly acidified to pH=2.3 with 10% aqueous HCl, causing the precipitation of 350 mg of a white solid, determined by $^1$HNMR to be the corresponding dicarboxylic acid. The diacid was then suspended in 50 mL CH$_2$Cl$_2$ at 0° C., and to this stirred suspension was added a solution of 470 mg oxalyl chloride in 5 mL CH$_2$Cl$_2$ dropwise. After no physical change was observed in the reaction flask after ten minutes, 2 drops dimethylformamide (DMF) were added to the reaction mixture, resulting in HCl gas production. The solution was stirred at room temperature for 2 hours, and then solvent removed in vacuo, along with any excess oxalyl chloride. The crude diacid chloride was then dissolved in 20 mL fresh CH$_2$Cl$_2$, and added over 20 minutes to a 0° C. stirred solution of 500 mg dipropyl amine in 30 mL CH$_2$Cl$_2$. The solution was poured into 25 mL of ice water after 2.5 hours of stirring. The mixture was extracted with CH$_2$Cl$_2$ (2×50 mL). The combined organic layers were washed with H$_2$O (2×25 mL) and brine (1×25 mL). The product was isolated by preparative liquid chromatography (silica gel, ethyl acetate/hexanes) to yield 350 mg as a light yellow oil. Recrystallization from hexanes gave a white solid. The product was characterized by electrospray mass spectroscopy (M$^+$+1 peak at m/e=389) and $^1$H NMR (CDCl$_3$) δ0.80 (t, 6 H), 0.89 (t, 6 H), 1.27 (s, 6 H), 1.49–1.35 (m, 4 H), 1.60–1.49 (m, 4 H), 1.69 (s, 6 H), 3.46–3.05 (m, 8 H).

Synthesis of ethyl 2-phenylquadricyclane-1-carboxylate (R-8)

A heavy-walled glass tube was charged with ethyl phenylpropiolate (5.0 g, 29 mmol), 2.85 g (43 mmol) of freshly distilled cyclopentadiene, 5 mL of xylenes, and 20 mg of 3,3'-di-t-butyl-4,4'-dihydroxy-6,6'-dimethyl diphenyl sulfide, and sealed under argon. The tube was heated for 48 h at 175° C., and then cooled. The product was isolated by fractional distillation at reduced pressure, to provide 3.1 g (45% of theoretical) of ethyl 2-phenylnorbornadiene-1-carboxylate, bp 92–107° C./0.05 mm. This intermediate product was characterized by NMR and by mass spectroscopy. $^1$H NMR (CDCl$_3$) δ1.21 (t, 3 H), 2.06 (m, 1 H), 2.24 (m, 1 H), 3.85 (m, 1 H), 4.06 (m, 1 H), 4.14 (qt, 2 H), 6.92 (m, 1 H), 6.98 (m, 1 H), 7.25 (m, 3 H), 7.52 (m, 2 H). Electrospray mass spectroscopy showed the molecular ion at m/e 241$^+$.

Ethyl 2-phenylnorbornadiene-1-carboxylate (1.24 g, 5.2 mmol) was dissolved in 50 mL of acetonitrile and irradiated in a Rayonet photochemical reactor using 350 nm light for 24 h at room temperature to produce ethyl 2-phenylquadricyclane-1-carboxylate in quantitative yield. The product was characterized by NMR. $^1$H NMR (CDCl$_3$) δ1.05 (t, 3 H), 2.13 (dt, 1 H), 2.22 (dd, 1 H), 2.37 (dt, 1 H), 2.44 (m, 1 H), 2.54 (dd, 1 H), 3.99 (qt, 2 H), 7.15 (m, 1 H), 7.25 (m, 4 H).

Synthesis of dimethyl quadricyclane-1,5-dicarboxylate (R-9)

A mixture of 5.00 g (35 mmol) of dimethyl acetylene dicarboxylate, 2.79 g (42 mmol) of cyclopentadiene, and 10 mL of toluene were sealed in a heavy walled glass tube and heated at 100° C. for 20 h. After cooling to room temperature and removal of the solvent, the resulting oil was distilled at reduced pressure, collecting the fraction bp 66–80° C./0.05 mm. The yield of the intermediate product, dimethyl norbornadiene 2,3-dicarboxylate, was 4.8 g (65%). The intermediate product was characterized by NMR and by mass spectroscopy. $^1$H NMR (CDCl$_3$) δ2.11 (m, 1 H), 2.27 (m, 1 H), 2.24 (m, 1 H), 3.78 (s, 6 H), 3.94 (m, 2 H), 6.92 (t, J=1.9 Hz, 2 H). Electrospray mass spectroscopy showed the molecular ion at m/e 209$^+$.

The intermediate product (3.10 g, 15 mmol) was dissolved in 60 mL of acetonitrile and placed in a tall glass tube. This solution was irradiated in a Rayonet photochemical reactor for 108 h with UV light of wavelength 340–360 nm. After the solvent was removed, the product was obtained as a gold oil. $^1$H NMR (CDCl$_3$) δ2.15 (m, 1 H), 2.33 (m, 3 H), 2.50 (m, 2 H), 3.68 (s, 6 H).

Synthesis of 1,5-diphenyl quadricyclane (R-10)

First, the intermediate product 2,3-diphenylnorbornadiene was prepared as follows: A solution of 2,3-bis(tert-butylsulfonyl)norbornadiene (prepared according to the procedure of Riera, et al. Tetrahedron Letters 1990, volume 31, page 2173) (5.50 g, 19 mmol) in dry tetrahydrofuran (50 mL) was treated with 95 mmol of phenyl lithium at −78° C. under an argon atmosphere. After allowing the reaction mixture to gradually warm to room temperature overnight, methanol (25 mL) was added, and the solution was partially concentrated at reduced pressure. The resulting mixture was mixed with water (50 mL) and extracted with dichloromethane (2×50 mL). The combined organic extracts were dried over magnesium sulfate and concentrated to deposit a brown oil. The intermediate product was purified by column chromatography (silica gel, hexane/dichloromethane), followed by recrystallization from methanol to provide 1.25 g (27% yield) of 2,3-diphenylnorbornadiene as a white solid. $^1$H NMR (CDCl$_3$) δ2.10 (m, 1 H), 2.40 (m, 1 H), 3.92 (m, 2 H), 7.01 (t, 2 H), 7.2–7.3 (m, 10 H).

2,3-Diphenylnorbornadiene (0.50 g, 2.0 mmol) was dissolved in 25 mL of chloroform, deaerated by bubbling nitrogen through the solution for 5 minutes, and placed in a tall glass tube. This solution was irradiated in a Rayonet photochemical reactor for 18 h with UV light of wavelength 340–360 nm. After the solvent was removed, the product 1,5-diphenyl quadricyclane was obtained as a tan oil. $^1$H NMR (CDCl$_3$) δ1.89 (m, 2 H), 2.20 (m, 2 H), 2.42 (m, 1 H), 7.0–7–2 (m, 10 H).

Example 1

Different Sensitizers

Optical Recording Element 1

A solution of 0.060 g of the reactant, hexamethyldewarbenzene (R-1), 0.88 g of binder, poly(methyl methacrylate), and 0.0015 g of sensitizer S-2 in 5 mL of dichloromethane was hand-coated on a poly(ethylene terephthalate) support using a 125 μm doctor blade. The element was protected from UV light at all times. The element was dried for 15 min. at room temperature, cut into 5×5 cm. squares, mounted in metal frames, and then dried further at 40 ° C. for 1 hour in a vacuum oven.

Optical Recording Element 2

This element is the same as Optical Recording Element 1 except that the sensitizer was S-26.

Optical Recording Element 3

This element is the same as Optical Recording Element 1 except that the sensitizer was S-4.

Optical Recording Procedure 1

An experimental apparatus was used consisting of a UV interferometer to write a holographic grating in a sample element and a rotation stage and probe beam to measure the angular spectrum of the grating. The light source for the UV interferometer was an argon-ion laser beam at a wavelength of 3507 Å. This laser beam was spatially filtered with a 10× UV microscope objective and a 5 μm pinhole before being collimated in a 7.5 mm diameter beam by a 50 mm focal length fused silica lens. This UV beam defined the optical axis of the apparatus. A phase mask with a period of 1070 nm dispersed the UV beam according to the grating equation. The zero-order beam was blocked so that it could not reach the sample plane.

The first-order diffracted beams, which define the plane of incidence, each propagated away from the grating at an angle of 19.15° with respect to the optical axis. Two plane mirrors, positioned approximately 23 cm. from the phase mask as measured along the optical axis, directed the first-order diffracted beams to the film plane where they intersected at an angle of 32.19°. The sample plane was positioned 50 cm. from the phase mask, as measured along the optical axis. The optical axis was normal to the film plane and bisected the 32.19° angle made by the interfering UV beams. The fringe pattern formed by the interfering UV beams was sinusoidal with a period of 633 nm.

The light source for the probe beam was a helium-neon laser beam at a wavelength of 6328 Å. The probe beam was polarized perpendicularly to the plane of incidence. This laser beam was spatially filtered with a 10× microscope objective and a 25 μm pinhole before being collimated in a 3.0 mm diameter beam by a 5× microscope objective. The probe beam was modulated at 1400 Hz by a chopper wheel so that a lock-in amplifier could be used for low noise detection. The probe beam intersected the sample plane at an angle of 30.00° with respect to the optical axis. This angle satisfied the Bragg condition for maximum diffraction efficiency. The sample was mounted on a rotation stage so that the diffraction efficiency of the holographic grating could be measured as a function of angular detuning from the Bragg angle.

A measurement of the exposure characteristics of a sample element began with an alignment check of the apparatus. A microscope slide was placed in the sample plane and the back-reflections from its surface were used to verify that the sample plane was normal to the optical axis, that the probe beam was incident at 30.00°, that the UV beams were intersecting at an angle of 32.19°, and that the optical axis bisected the angle made by the UV beams. Once this alignment was completed, the argon-ion laser power was adjusted such that the power in each of the interfering UV beams was 3.0 mW. The power of the probe beam was measured in Volts by the lock-in amplifier so that the diffraction efficiency measurements could be normalized.

The writing procedure was as follows. The UV beams were blocked with a shutter while the sample was clamped in position. The apparatus was allowed to relax for a minimum of 60 sec so that the mechanical and thermal disturbances caused by the alignment procedure could decay. The sample was then exposed to the interfering UV beams for a predetermined length of time while a computer recorded the power of the diffracted probe beam. At the end of the exposure, the UV beams were blocked and the power of the diffracted probe beam was measured as a function of angular detuning from the Bragg angle. From these two sets of data, the angular spectrum of the grating, diffraction efficiency vs. time, and index modulation vs. time curves could be generated. The results are listed below.

The exposure to the recording beam as described above creates a diffraction grating in the material due to the creation of a pattern of refractive index changes. The diffraction efficiency listed in the tables below is a measurement of the pattern of refractive index change recorded and any number greater than zero is desirable.

Optical Recording Procedure 2

The procedure was identical to Optical Recording Procedure 1, except that a Krypton ion laser was employed, with an output wavelength of 406 nm, and the power in each of the interfering beams was 8 mW. The results are listed below.

Optical Recording Procedure 3

The procedure was identical to Optical Recording Procedure 2, except the power in each of the interfering beams was 24 mW. The results are listed below.

TABLE 5

| Optical Recording Element | Optical Recording Procedure | Optical density at recording wavelength | Time (sec) | Diffraction Efficiency (%) | Width of Angular Spectrum (deg.) | Change in Refractive Index |
|---|---|---|---|---|---|---|
| 1 | 1 | 0.14 | 10 | 0.023 | | |
| 1 | 1 | 0.14 | 40 | 0.081 | | |
| 1 | 1 | 0.14 | 150 | 0.170 | 4.2 | $4.8 \times 10^{-4}$ |
| 2 | 1 | 0.20 | 10 | 0.019 | | |
| 2 | 1 | 0.20 | 40 | 0.035 | 7.5 | $2.2 \times 10^{-4}$ |
| 3 | 1 | 0.26 | 10 | 0.010 | | |
| 3 | 1 | 0.26 | 40 | 0.023 | | |
| 3 | 1 | 0.26 | 100 | 0.034 | 6.5 | $2.2 \times 10^{-4}$ |

The above results show that a pattern of refractive index change can be recorded in the materials of Optical Recording Elements 1–3, and therefore sensitizers S-2, S-26 and S-4 are all effective sensitizers for the isomerization reaction.

Example 2

Different Binder

Optical Recording Element 4

This element was the same as Optical Recording Element 1 except that the binder was Bisphenol A polycarbonate.

Optical Recording Element 4 was tested as in Example 1 and compared to Optical Recording Element 1. The following results were obtained:

TABLE 6

| Optical Recording Element | Optical Recording Procedure | Optical density at recording wavelength | Time (sec) | Diffraction Efficiency (%) | Width of Angular Spectrum (deg.) | Change in Refractive Index |
|---|---|---|---|---|---|---|
| 1 | 1 | 0.14 | 10 | 0.023 | | |
| 1 | 1 | 0.14 | 40 | 0.081 | | |
| 1 | 1 | 0.14 | 150 | 0.170 | 4.2 | $4.8 \times 10^{-4}$ |
| 4 | 1 | 0.06 | 10 | 0.0048 | | |
| 4 | 1 | 0.06 | 40 | 0.021 | | |
| 4 | 1 | 0.06 | 150 | 0.051 | | |
| 4 | 1 | 0.06 | 250 | 0.060 | 7.4 | $2.9 \times 10^{-4}$ |

The above results show that a pattern of refractive index change can be recorded in materials of Optical Recording Elements 1 and 4 containing different binders.

Example 3

Different Reactants

Optical Recording Element 5

This element was prepared the same as Optical Recording Element 1 except that the reactant was ethyl pentamethyldewarbenzoate (R-2).

Optical Recording Element 6

This element was prepared the same as Optical Recording Element 1 except that the reactant was 2-phenyl-3,4,5,6-tetraamethyldewarbenzoate (R-3).

Optical Recording Element 7

This element was prepared the same as Optical Recording Element 1 except that the reactant was ethyl 2-phenylquadricyclane-1-carboxylate (R-8)

Optical Recording Element 8

This element was prepared the same as Optical Recording Element 1 except that the reactant was 3,4-diphenyl-1,2-cyclobutanedicarboxylic acid, cyclic trimethylene ester (R-12), which was prepared by the procedure of Freedman, et al. (Organic Preparations and Procedures International, 1969, volume 1, page 267).

Optical Recording Element 9

This element was prepared the same as Optical Recording Element 1 except that the reactant was 2,5-dimethyl-3,4-diphenyl-pentacyclo[4.4.0.02,5.03,8.04,7]decane) (R-13), which was prepared by the procedure of Hasegawa, et al. (Journal of Organic Chemistry, volume 56, page 2170).

Optical Recording Element 10

This element was prepared the same as Optical Recording Element 1 except that the reactant was 2,3-diphenylquadricyclane (R-10), and the amount of reactant employed was 5 wt. %.

Optical Recording Element 11

This element was prepared the same as Optical Recording Element 1 except that the reactant was ethyl 2-phenyl-3,4,5,6-tetraamethyldewarbenzoate (R-3).

Optical Recording Element 12

This element was prepared the same as Optical Recording Element 1 except that the reactant was ethyl 2-(4-methoxyphenyl)-3,4,5,6-tetraamethyldewarbenzoate (R-5).

Optical Recording Elements 5–12 were tested as in Example 1 and compared to Optical Recording Element 1. The following results were obtained:

TABLE 7

| Optical Recording Element | Optical Recording Procedure | Optical density at recording wavelength | Time (sec) | Diffraction Efficiency (%) | Width of Angular Spectrum (deg.) | Change in Refractive Index |
|---|---|---|---|---|---|---|
| 1 | 1 | 0.14 | 10 | 0.023 | | |
| 1 | 1 | 0.14 | 40 | 0.081 | | |
| 1 | 1 | 0.14 | 150 | 0.170 | 4.2 | $4.8 \times 10^{-4}$ |
| 5 | 3 | 0.20 | 20 | 0.66 | | |
| 6 | 2 | 0.20 | 240 | 0.57 | | |
| 6 | 3 | 0.20 | 20 | 1.1 | | |
| 7 | 2 | 0.20 | 15 | 0.09 | | |
| 8 | 2 | 0.20 | | 0.0015 | | |
| 9 | 1 | 0.08 | 10 | 0.00076 | | |
| 9 | 1 | 0.08 | 40 | 0.0016 | | |
| 9 | 1 | 0.08 | 150 | 0.0025 | 4.8 | $5.7 \times 10^{-5}$ |
| 10 | 2 | 0.20 | 15 | 0.020 | | |
| 11 | 2 | 0.20 | 240 | 0.024 | | |
| 12 | 2 | 0.20 | 240 | 0.0020 | | |

The above results show that a pattern of refractive index change can be recorded in media containing any of the reactants employed in the various optical recording elements.

Example 4

Comparative
Optical Recording Element 13
This element was prepared the same as Optical Recording Element 2 except that the amount of reactant employed was 5 wt. % and the sensitizer was S-25.
Control Optical Recording Element C-1
This element was prepared the same as Optical Recording Element 6 except that no reactant was used and the amount of sensitizer employed was doubled.
Control Optical Recording Element C-2
This element was prepared the same as Optical Recording Element 6 except that no sensitizer was used.
These elements were tested the same as in Example 1 except that the recording wavelength was 325 nm at 0.3 mW/cm² power. The following results were obtained:

TABLE 8

| Optical Recording Element | Optical Recording Procedure | Time (min/) | Diffraction Efficiency (%) |
|---|---|---|---|
| 13 | 1 | 20 | 0.094 |
| C-1 | 1 | 30 | 0 |
| C-2 | 1 | 30 | 0 |

The above results show that the diffraction efficiency of Recording Element 13 of the invention is greater than zero, which is desirable, while the comparative optical recording elements which do not contain both a reactant and sensitizer have a diffraction efficiency of 0. Therefore both a reactant and sensitizer must be present in the optical recording element in order to obtain a useful optical recording element.

Example 5
Permanance
The diffraction efficiency of Optical Recording Element 1 was measured and found to be 0.118%. After storing the element at 22° C. for 106 days, the diffraction efficiency was remeasured and found to be 0.115%. The results show that a permanent, stable pattern of refractive index change can be recorded.

This invention has been described with particular reference to preferred embodiments thereof but it will be understood that modifications can be made within the spirit and scope of the invention.

What is claimed is:

1. An optical recording material which when exposed to actinic radiation produces a change in optical properties in the exposed regions, thereby providing a pattern of intelligence for storing and retrieving information, said recording material comprising:

a) a binder;
   b) a reactant which is capable of undergoing a chemical transformation other than polymerization upon a one electron oxidation, thus causing said change in optical properties in the exposed regions; and
   c) a sensitizer capable of absorbing actinic radiation to cause an initial one electron oxidation of said reactant and accepts the one electron from said reactant;

wherein said chemical transformation of said reactant is an isomerization, cyclization, cycloaddition, or cycloreversion reaction.

2. The optical recording material of claim 1 wherein said sensitizer comprises from about 0.001 to about 10% by weight of said material, said reactant comprises from about 1 to about 50% by weight of said material, with the balance being binder.

3. The optical recording material of claim 1 wherein said binder and said reactant have certain oxidation potentials and the oxidation potential of said reactant minus the oxidation potential of said binder is less than 0.3 V.

4. The optical recording material of claim 1 wherein said binder is a polymeric binder.

5. The optical recording material of claim 4 wherein said polymeric binder is poly(alkyl methacrylate), poly(alkyl acrylate), polystyrene, polycarbonate, cellulose acetate or poly(vinyl butyral).

6. The optical recording material of claim 1 wherein said reactant undergoes the following transformation:

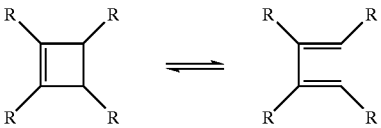

wherein each R independently represents H, a substituted or unsubstituted alkyl or alkoxy group having from about 1 to about 12 carbon atoms, a cyano group, a carboxylate group, a substituted or unsubstituted aryl group having from about 6 to about 18 carbon atoms, a substituted or unsubstituted heteroaromatic group, or two or more R groups can be joined together to form an additional ring system.

7. The optical recording material of claim 6 wherein said reactant undergoes one of the following transformations:

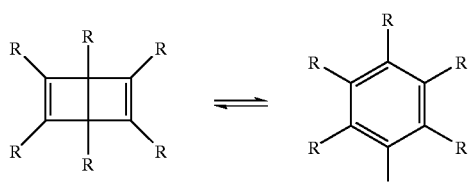

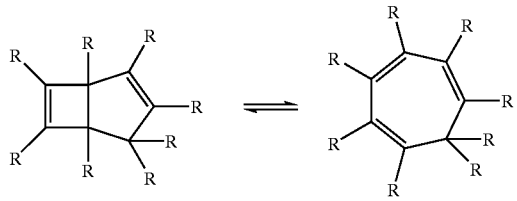

or

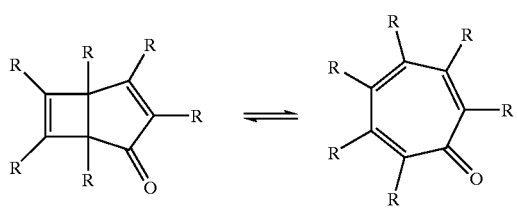

wherein each R independently represents H, a substituted or unsubstituted alkyl or alkoxy group having from about 1 to about 12 carbon atoms, a cyano group, a carboxylate group, a substituted or unsubstituted aryl group having from about 6 to about 18 carbon atoms, a substituted or unsubstituted heteroaromatic group, or two or more R groups can be joined together to form an additional ring system.

8. The optical recording material of claim 7 wherein said reactant undergoes one of the following transformations:

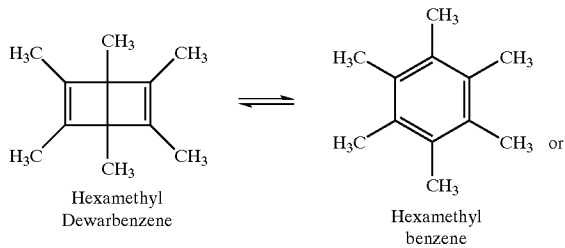

Hexamethyl Dewarbenzene ⇌ Hexamethyl benzene or

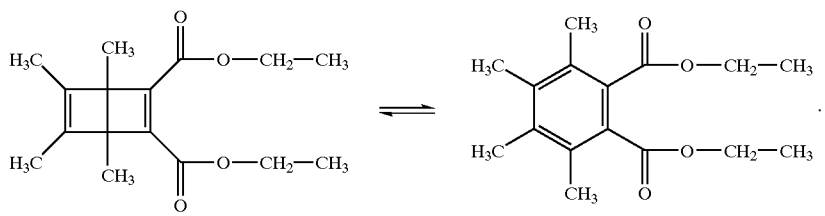

9. The optical recording material of claim 1 wherein said reactant undergoes the following transformation:

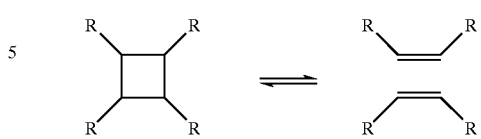

wherein each R independently represents H, a substituted or unsubstituted alkyl or alkoxy group having from about 1 to about 12 carbon atoms, a cyano group, a carboxylate group, a substituted or unsubstituted aryl group having from about 6 to about 18 carbon atoms, a substituted or unsubstituted heteroaromatic group, or two or more R groups can be joined together to form an additional ring system.

10. The optical recording material of claim 9 wherein said reactant undergoes one of the following transformations:

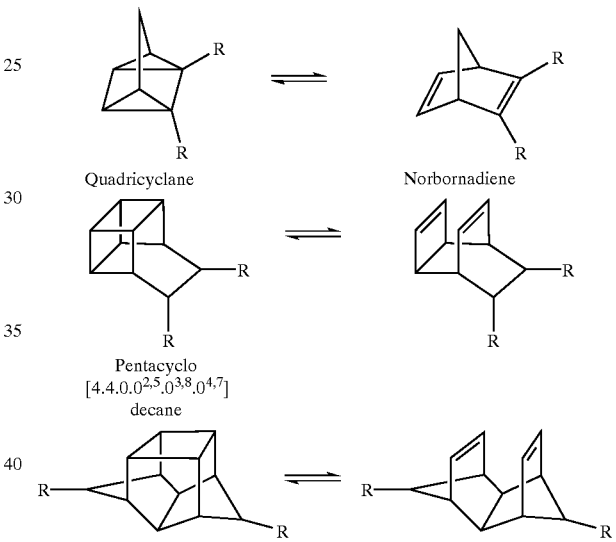

Quadricyclane ⇌ Norbornadiene

Pentacyclo [4.4.0.0$^{2,5}$.0$^{3,8}$.0$^{4,7}$] decane

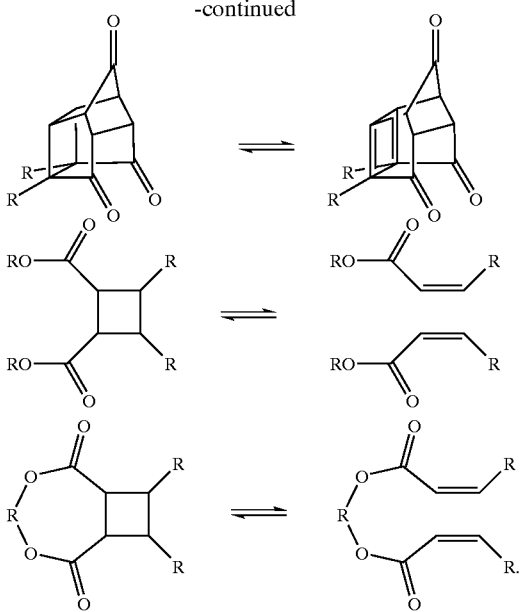

11. The optical recording material of claim 10 wherein said reactant undergoes one of the following transformations:

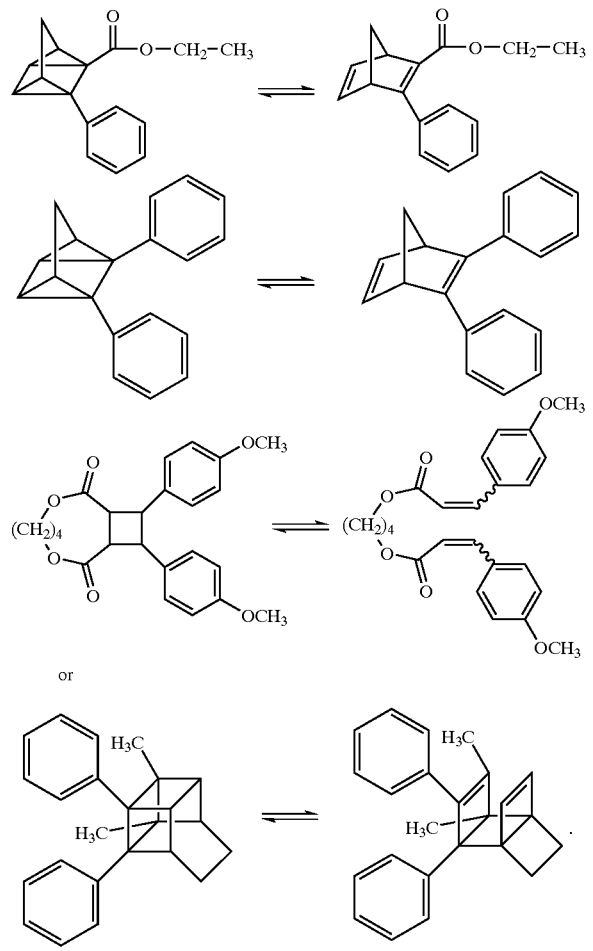

12. The optical recording material of claim 1 wherein said reactant undergoes a one electron oxidation forming an oxidized reactant, said oxidized reactant is transformed into an oxidized product, and said oxidized product is capable of oxidizing additional said reactant, thus defining the propagation of a chain reaction.

13. The optical recording material of claim 1 wherein the algebraic sum of the excitation energy of said sensitizer and its reduction potential is approximately equal to or larger than the oxidation potential of said reactant, whereby said sensitizer upon absorption of said actinic radiation will be capable of accepting an electron from said reactant.

14. The optical recording material of claim 13 wherein said sensitizer is a cyanoaromatic compound, a pyridinium salt, a pyryllium salt, a thiopyryllium salt, a quinone, or a cyanine dye.

15. The optical recording material of claim 13 wherein said sensitizer is:

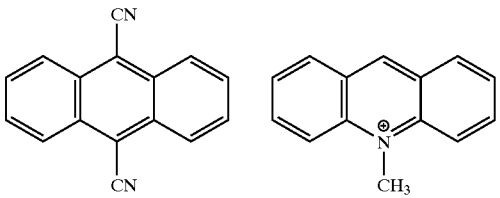

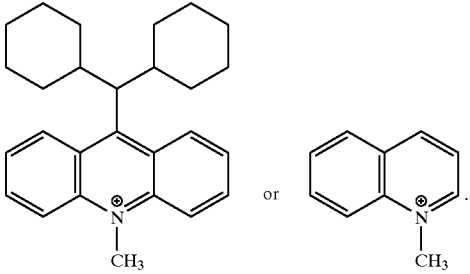

16. The optical recording material of claim 1 wherein said sensitizer upon absorption of actinic radiation reacts to produce a fragment radical cation, said fragment radical cation being capable of accepting an electron from said reactant, whereby the oxidation potential of the neutral fragment is greater than that of said reactant.

17. The optical recording material of claim 16 wherein said sensitizer is:

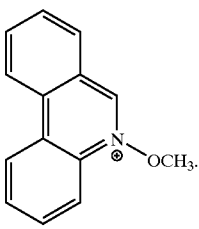

18. The optical recording material of claim 1 wherein said change in optical properties comprises a change in refractive indexes.

19. An optical recording element comprising a support having thereon the optical recording material of claim 1.

* * * * *

UNITED STATES PATENT AND TRADEMARK OFFICE
CERTIFICATE OF CORRECTION

PATENT NO. : 6,569,600 B2
DATED : May 27, 2003
INVENTOR(S) : Joseph P. Dinnocenzo et al.

It is certified that error appears in the above-identified patent and that said Letters Patent is hereby corrected as shown below:

Column 4,
Line 55, please delete " 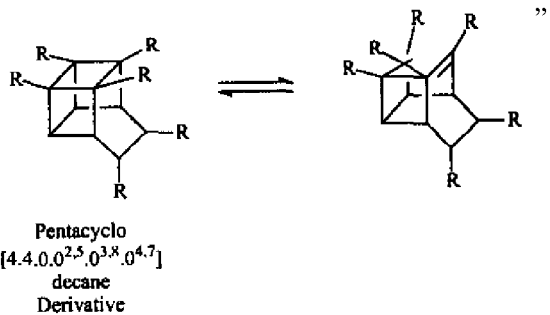 "

and in place thereof, insert: -- 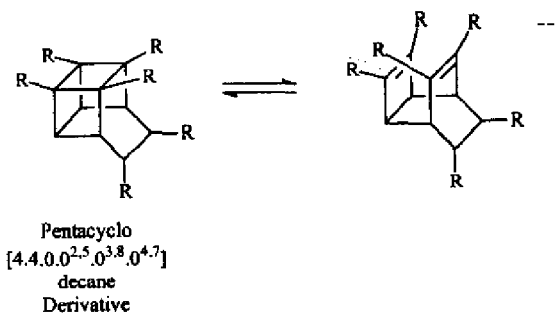 --

Line 65, please delete

"  "

and in place thereof, insert:

--  --

UNITED STATES PATENT AND TRADEMARK OFFICE
CERTIFICATE OF CORRECTION

PATENT NO. : 6,569,600 B2
DATED : May 27, 2003
INVENTOR(S) : Joseph P. Dinnocenzo et al.

It is certified that error appears in the above-identified patent and that said Letters Patent is hereby corrected as shown below:

Column 6,
Line 30, please delete " 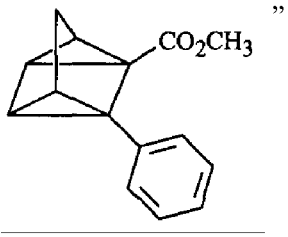 "

and in place thereof, insert: -- 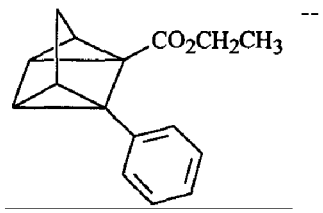 --

Column 25,
Line 5, please delete

" 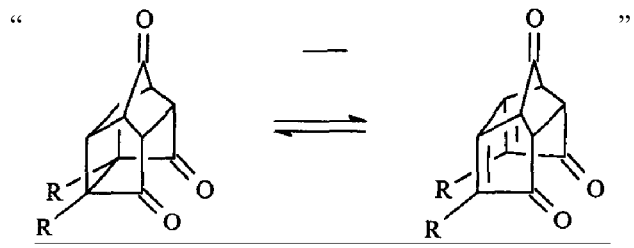 "

and in place thereof, insert:

-- 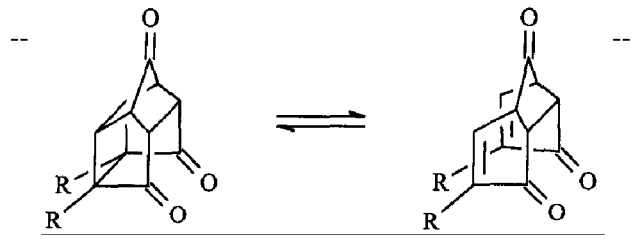 --

UNITED STATES PATENT AND TRADEMARK OFFICE
CERTIFICATE OF CORRECTION

PATENT NO. : 6,569,600 B2
DATED : May 27, 2003
INVENTOR(S) : Joseph P. Dinnocenzo et al.

It is certified that error appears in the above-identified patent and that said Letters Patent is hereby corrected as shown below:

Column 26 (cont'd),
Line 60, please delete

"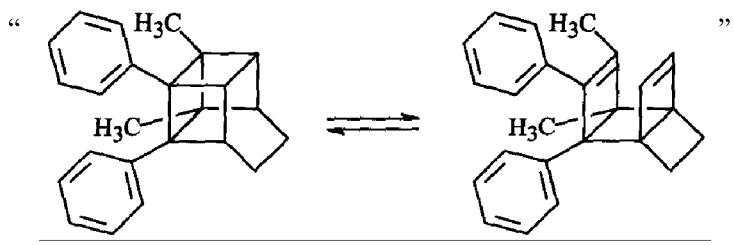"

and in place thereof, insert:

-- 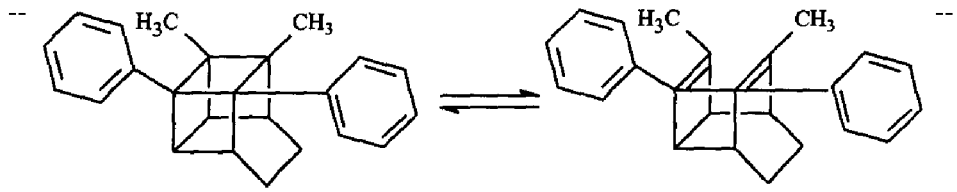 --

Signed and Sealed this

Twenty-second Day of March, 2005

JON W. DUDAS
*Director of the United States Patent and Trademark Office*